United States Patent
Chatfield et al.

(10) Patent No.: US 11,989,787 B2
(45) Date of Patent: May 21, 2024

(54) REMOTE VEHICLE DAMAGE ASSESSMENT

(71) Applicant: Tractable Ltd, London (GB)

(72) Inventors: Ken Chatfield, London (GB); Razvan Ranca, London (GB)

(73) Assignee: Tractable Ltd, London (GB)

( * ) Notice: Subject to any disclaimer, the term of this patent is extended or adjusted under 35 U.S.C. 154(b) by 126 days.

(21) Appl. No.: 17/453,018

(22) Filed: Nov. 1, 2021

(65) Prior Publication Data
US 2022/0138860 A1 May 5, 2022

Related U.S. Application Data

(60) Provisional application No. 63/198,628, filed on Oct. 30, 2020.

(30) Foreign Application Priority Data

Nov. 4, 2020 (GB) .................................. 2017464

(51) Int. Cl.
*G06Q 40/00* (2023.01)
*G06F 18/24* (2023.01)
(Continued)

(52) U.S. Cl.
CPC ............. *G06Q 40/08* (2013.01); *G06F 18/24* (2023.01); *G06N 3/02* (2013.01); *G06Q 10/10* (2013.01); *G06V 20/56* (2022.01)

(58) Field of Classification Search
CPC ........ G06Q 40/08; G06Q 10/10; G06F 18/24; G06N 3/02; G06N 3/044; G06N 3/045;
(Continued)

(56) References Cited

U.S. PATENT DOCUMENTS 11,003,947 B2 * 5/2021 Zoldi .................... G06F 18/214
11,037,348 B2 * 6/2021 Shi ............................ G06T 7/60
(Continued)

FOREIGN PATENT DOCUMENTS

WO   2020/077449   4/2020

OTHER PUBLICATIONS

Automating Car Insurance Claims Using Deep Learning Techniques; 2019 IEEE Fifth International Conference on Multimedia Big Data (BigMM) (pp. 199-207); Ranjodh Singh, Meghna P. Ayyar, Tata Venkata, Sri Pavan, Rajiv Ratn Shah; Sep. 11, 2019.. (Year: 2019).*

(Continued)

*Primary Examiner* — Tien C Nguyen
(74) *Attorney, Agent, or Firm* — Fay Kaplun & Marcin, LLP

(57) ABSTRACT

A user device includes a camera configured to capture a series of images of a vehicle and a processor configured to receive a first image of the vehicle from a first viewpoint, classify, for the first image, one or more parts of the vehicle captured in the first image, generate, for the first image, a first graphic indicating the parts of the vehicle being displayed in the first image and a display configured to receive the first image and the first graphic from the processor and display the first image of the vehicle with the first graphic indicating the parts of the vehicle being displayed in the first image.

20 Claims, 3 Drawing Sheets

User Device
100

(51) Int. Cl.
*G06N 3/02* (2006.01)
*G06Q 10/10* (2023.01)
*G06Q 40/08* (2012.01)
*G06V 20/56* (2022.01)

(58) Field of Classification Search
CPC .......... G06N 3/08; G06V 20/56; G06V 10/82; G06V 20/10
USPC ................... 705/4, 5, 40, 39, 37, 38, 45, 70; 345/633, 32; 348/148; 709/219, 226; 715/210; 235/379, 380
See application file for complete search history.

(56) References Cited

U.S. PATENT DOCUMENTS

| | | | | |
|---|---|---|---|---|
| 2006/0001596 | A1* | 1/2006 | Cuffaro | G06F 3/1438 345/32 |
| 2009/0138544 | A1* | 5/2009 | Wegenkittl | G06F 9/5083 709/226 |
| 2010/0199160 | A1* | 8/2010 | Klassen | G06F 16/9577 715/210 |
| 2011/0078120 | A1* | 3/2011 | Tyhurst | H04L 67/025 709/219 |
| 2012/0075343 | A1* | 3/2012 | Chen | G06T 7/73 345/633 |
| 2015/0343950 | A1* | 12/2015 | Heinemann | H04N 23/90 348/148 |
| 2018/0260651 | A1* | 9/2018 | Wang | G06V 20/56 |
| 2018/0260793 | A1* | 9/2018 | Li | G06Q 40/08 |
| 2018/0300576 | A1* | 10/2018 | Dalyac | G06N 7/08 |
| 2019/0073560 | A1* | 3/2019 | Matei | G06N 3/08 |

OTHER PUBLICATIONS

WO-2020077449-A1; Automated Artificial Intelligence Vehicle Appraisals; . Discovery Loft Inc. [CA/CA]; 145 Front Street East, Unit 102, Toronto, Ontario M5A IE3 (CA); Oct. 16, 2019. (Year: 2019).*
Intuitive visualization of vehicle distance, velocity and risk potential in rear-view camera applications; 2013 IEEE Intelligent Vehicles Symposium (IV) (pp. 579-585); Christoph Roessing, Axel Reker, Michael Gabb, Klaus Dietmayer, Hendrik P. A. Lensch, Jun. 23, 2013. (Year: 2013).*

* cited by examiner

User Device
100

System
200

Display
300

Display
320

Display
340

Method
400

REMOTE VEHICLE DAMAGE ASSESSMENT

PRIORITY CLAIM/INCORPORATION BY REFERENCE

This application claims priority to U.S. Provisional Application Ser. No. 63/198,628 filed on Oct. 30, 2020 and entitled "Remote Vehicle Damage Assessment," and UK Patent Application 2017464.5 filed Nov. 4, 2020, both of which are incorporated herein by reference.

BACKGROUND

An image-based artificial intelligence (AI) system may be used to provide a rapid damage estimate for a vehicle. The AI system may operate by receiving images of a damaged vehicle, classifying the damage, and providing an assessment of the damage, e.g., an estimated repair cost, to a user without involving a professional claims adjuster.

Existing systems may include a server receiving images of the vehicle and executing a series of classifiers for determining, for example, which part of the car (e.g., front bumper, windshield, etc.) has been captured in the image, what type of damage the car part has suffered, the extent of the damage, etc. The user seeking the estimate may execute a mobile application, e.g., on a user device including a camera, and receive instructions to capture the information necessary to provide the estimate. For example, the user may be requested to manually provide an identification for the vehicle, e.g., a vehicle identification number (VIN), and prompts for capturing the damage in one or more images taken with the camera. After the information is captured at the user device and transmitted to the server, the server executes the AI and returns the damage assessment and/or estimate to the user.

In some systems, if the images do not adequately capture the damage and/or are low quality, the classifying AI may deem the images inadequate for providing the estimate. In this scenario, the user may be requested to provide additional images. However, a significant amount of time may be wasted, for example if the user is no longer located in proximity to the damaged car.

SUMMARY

Some exemplary embodiments are related to a user device having a camera configured to capture a series of images of a vehicle, a processor configured to perform operations and a display. The operations include receiving a first image of the vehicle from a first viewpoint, classifying, for the first image, one or more parts of the vehicle captured in the first image and generating, for the first image, a first graphic indicating the parts of the vehicle being displayed in the first image. The display is configured to receive the first image and the first graphic from the processor and display the first image of the vehicle with the first graphic indicating the parts of the vehicle being displayed in the first image.

Other exemplary embodiments are related to a user device including a camera configured to capture a series of images of a vehicle and a processor configured to perform operations. The operations include receiving a series of images of the vehicle from one or more viewpoints, classifying, for each of the images, one or more parts of the vehicle captured in the image using a web-based application comprising a first artificial intelligence (AI) model for identifying the parts of the vehicle, classifying, for each of the images, an extent of damage of the classified one or more parts of the vehicle captured in the images using the web-based application comprising a second AI model for identifying the damage of the vehicle and generating an estimate to repair the damage of the one or more parts of the vehicle.

DETAILED DESCRIPTION

Figure 1:
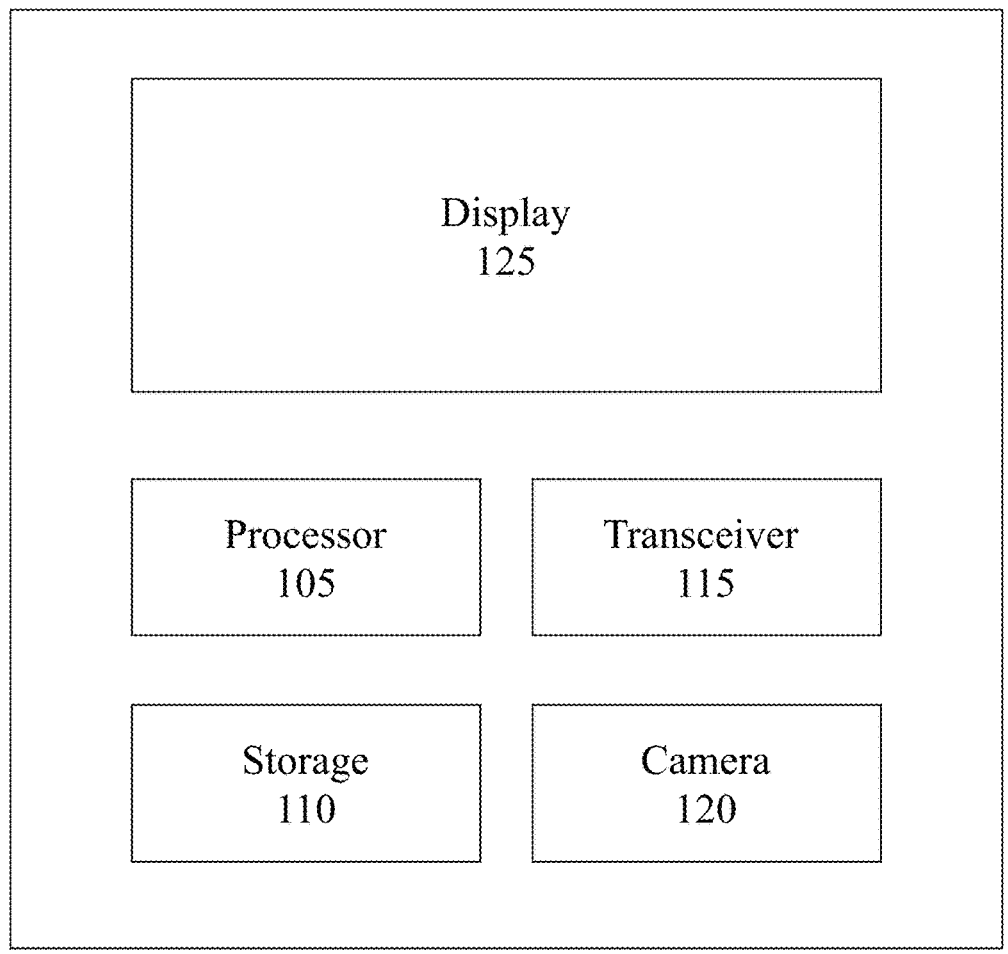
FIG. 1 shows an exemplary user device for providing a real-time damage estimate using an artificial intelligence (AI) based application according to various exemplary embodiments described herein.

The exemplary embodiments may be further understood with reference to the following description and the related appended drawings, wherein like elements are provided with the same reference numerals. The exemplary embodiments relate to a system and method for providing a real-time damage estimate using an artificial intelligence (AI) based application at a user device. According to some aspects, a camera capturing images of a vehicle is used in coordination with a dynamic display at the user device to provide feedback to the user and guide the user to capture images that are of sufficient quality for providing the damage estimate.

According to some aspects, one or more classifying AI systems are executed at the user device via, e.g., a web-based application designed to run on the user device. In one embodiment, a first classifier is used to determine which part(s) of the vehicle are shown in an image. In another embodiment, a second classifier is used to determine the damage done to the vehicle. In determining the damage, a classifier may either determine an assessment of the degree of damage or may determine possible repair methodologies, including whether the part should be repaired or replaced, and how many labor hours may be involved in a repair. In an alternative embodiment, a single classifier is used to identify parts and damage to said parts. With this combination of classifiers, the application can immediately produce a full or partial estimate for the repair of the damage to the vehicle. Additional classifiers and/or simpler processing mechanisms may be used to calculate and optionally provide additional information to the user via the dynamic display, to be described in greater detail below.

According to various exemplary embodiments described herein, the user device may execute the application and produce the damage estimate in real-time. That is, the damage assessment may be executed at the user device via, for example, a web-based application designed to run the classifying AI on the user device, contrary to previous systems where a remote server receives the images and performs the damage estimate at the server.

Throughout this disclosure the term "images" should be understood to refer to image data that is collected in any manner. In one example, the images may refer to one or more digital photographs. In another example, the images may be a series of one or more frames of a digital video. Those skilled in the art will understand any other manners of collecting image data.

FIG. 1 shows an exemplary user device 100 for providing a real-time damage estimate using an artificial intelligence (AI) based application according to various exemplary embodiments described herein. The user device 100 includes a processor 105 for executing the AI-based application. The AI-based application may be, in one embodiment, a web-based application hosted on a server and accessed over a network, e.g., a radio access network, via a transceiver 115 or some other communications interface.

Figure 2:
FIG. 2 shows an exemplary system including the user device of FIG. 1 in communication with a server via a network, wherein the server hosts the AI-based application that is executed at the user device.

FIG. 2 shows an exemplary system 200 including the user device 100 in communication with a server 210 via a network 205, wherein the server 210 hosts the AI-based application that is executed at the user device 100. However, in other embodiments, the user device 100 may store some or all of the application software at a storage 110 of the user device 100. For example, in some web-based applications, a user device 100 may store a part of the application software locally at the user device 100, while the majority of the processing is performed at the remote server, e.g., server 210. In another example, the user device 100 may store the entire application in the storage 110 of the user device 100, however, this may require significantly more storage capacity relative to the web-based application.

The user device 100 further includes a camera 120 for capturing images and a display 125 for displaying the application interface and/or images with a variety of information overlaid on the images, to be described in further detail below. The user device 100 may be any device that has the hardware and/or software to perform the functions described herein. In one example, the user device 100 may be a smartphone including the camera 120 located on a side (e.g., back) of the user device 100 opposite the side (e.g., front) on which the display 125 is located. The display 125 may be, for example, a touch screen for receiving user inputs in addition to displaying the images and/or other information via the web-based application.

The system described herein is designed to allow a user who suffered damage to a vehicle to rapidly execute the application at the smartphone and perform an initial damage estimate in real-time. The quality of the images being input into the classifier(s) is continuously assessed so that the user is guided to providing sufficiently high-quality images for performing the damage assessment.

According to some exemplary embodiments, the application includes a first classifier for determining what part of a vehicle has been captured in an image. Because the classifier is executed at the user device capturing the image, the application may dynamically indicate to the user what part of the vehicle is currently being viewed, in substantially real-time. The application includes a dynamic display that identifies what is currently seen in the image and updates the display periodically as the view of the vehicle changes. This dynamic view indication has various applications for the real-time damage assessment, to be discussed in detail below.

The classifying AI may be based on the use of one or more of: a non-linear hierarchical algorithm; a neural network; a convolutional neural network; a recurrent neural network; a long short-term memory network; a multi-dimensional convolutional network; a memory network; a fully convolutional network; or a gated recurrent network.

Figure 3A:
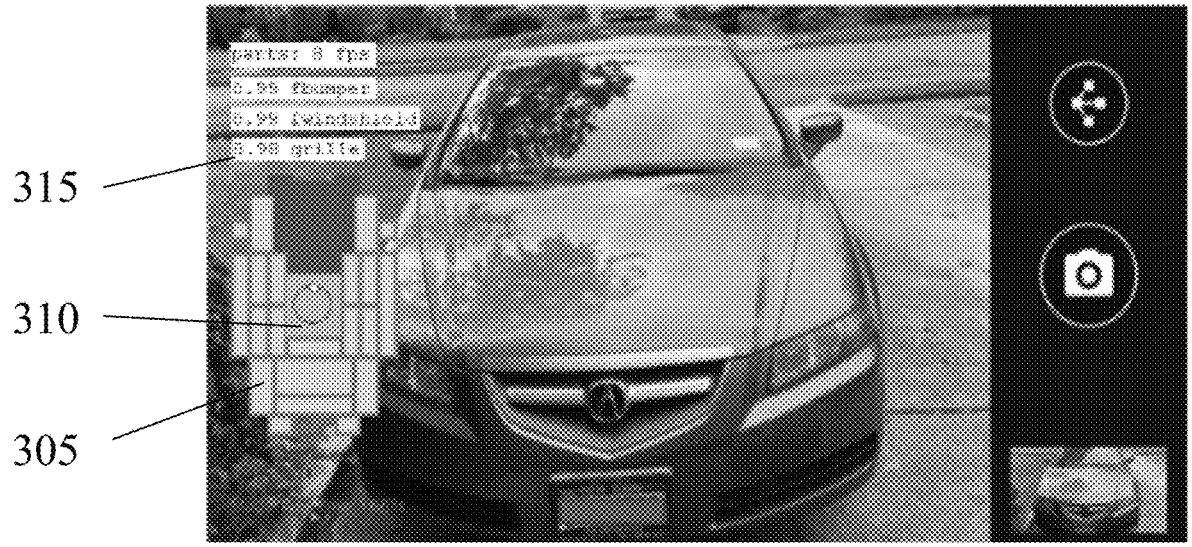
FIGS. 3*a-c* show exemplary dynamic displays for identifying various parts of a vehicle being viewed by a camera at a user device according to various exemplary embodiments described herein.
Figure 3B:
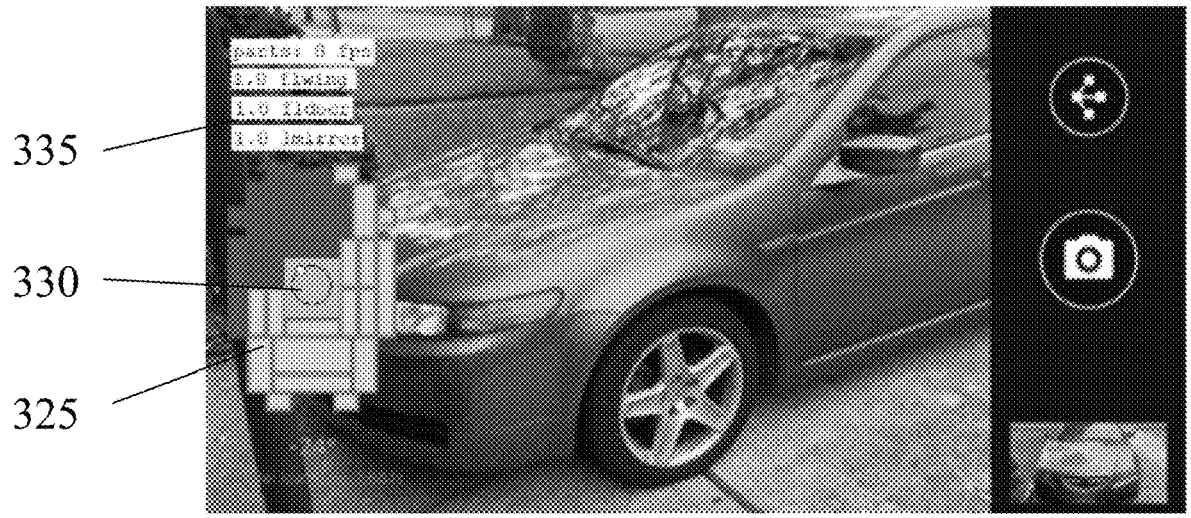
Figure 3C:
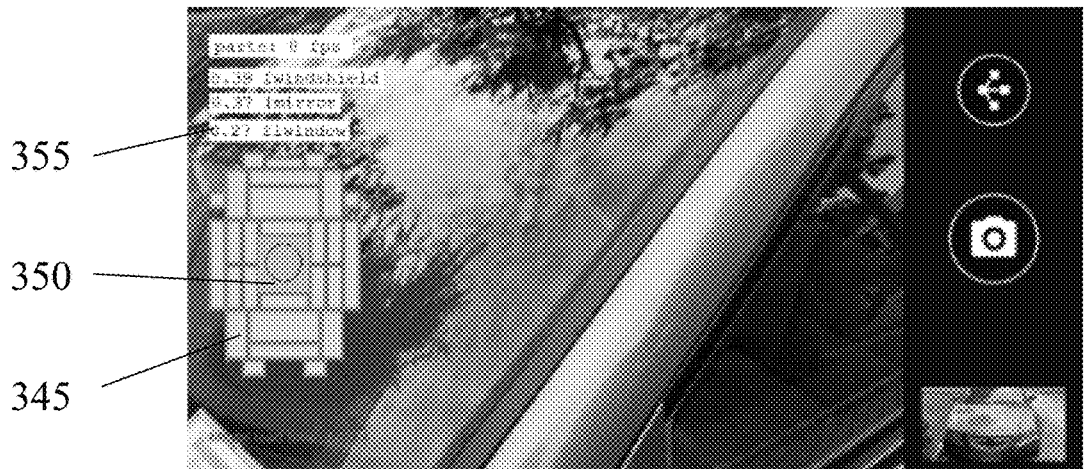

FIGS. 3a-c show exemplary dynamic displays for identifying various parts of a vehicle being viewed by a camera at a user device according to various exemplary embodiments described herein. FIG. 3a shows an exemplary dynamic display 300 of an image of the front of the vehicle, wherein the user is positioned in front of the vehicle and is directing the camera towards the front of the vehicle. Thus, parts of the vehicle shown in the image include the windshield, the front hood, the front bumper, the front grille, etc.

The dynamic display 300 includes a graphical diagram 305 of a generic vehicle in two dimensions. The two-dimensional graphic 305 is representative of a top view of the vehicle, with the sides, front and back of the vehicle unfolded outward relative to the center of the vehicle to show the aspects of the vehicle that would not typically be visible from a view above the vehicle. The two-dimensional graphic 305 is divided into sections, each section relating to a particular part of the vehicle. For example, the graphic 305 includes sections relating to a hood, doors, a trunk, taillights, etc. In an alternative embodiment, additional portions of the vehicle may be shown in the graphic 305, such as e.g., tires, etc. The graphic 305 generally shows parts of a generic vehicle that are identifiable by the classifier(s) of the application.

The application receives the images, executes the classifying AI, and returns to the user, by the dynamic display, an indication of what part of the vehicle is being viewed. The indication to the user comprises an indication, in the two-dimensional graphic 305 of the generic vehicle, that a given part of the vehicle is in the image. In the example of FIG. 3a, the parts of the vehicle captured in the present image are colored red, relative to the remaining parts of the vehicle (not captured in the image) that are not colored red. However, other ways may be used to indicate to the user the part of the vehicle being viewed. Alternatively, instead of or in addition to showing in the display which parts of the vehicle are currently shown in the image, the display could indicate the parts of the vehicle that have been previously captured in an image and are included in a file of previously captured images. For example, in some scenarios, the application may request full 360 degree views of the car, and, when a particular part of the car is captured in a current or previous image, the two-dimensional graphic 305 may keep that part of the car colored red until the complete 360 degree views are captured by the user. In another embodiment, the dynamic display could indicate which parts have been previously captured during the application session, and additionally indicate which parts are currently being seen by the camera, to assist the user to collect images of all the parts of interest, to be described further below.

Deep learning classifiers, in general, sort unlabeled data into labeled categories by using pattern recognition according to various rules specific to the type of data to be classified. Classifiers generally include calculations related to a confidence level for the classification. That is, the classifier may output a probability that the input data has been classified correctly. This confidence level can be generated on a per image basis, or can be based on a combination of results based on multiple images. According to some embodiments of the dynamic display, in addition to the graphical indication of the vehicle part, the classifying AI displays a list 315 of parts of the vehicle having a greatest probability of being classified correctly from the image. In the example of FIG. 3a, the list 315 includes three parts the classifying AI has determined that the image has captured in the view, e.g., the front bumper, the front windshield, and the grille of the vehicle. The corresponding confidence level in the classification is displayed next to the listed part, e.g., 0.99 for the front bumper, 0.99 for the front windshield, 0.98 for the grille.

In FIG. 3a, only the three parts with the highest probability of being classified correctly are displayed in the list 315. However, any number of parts may be listed. As can be seen in the two-dimensional graphic 305 of the vehicle, additional parts of the vehicle (including e.g., the front headlights), have been identified by the classifying AI. FIG. 3b, for example, shows a display 320 of a view of the same vehicle from the front left of the car. In this example, the classifying AI has determined that a variety of parts of the vehicle are shown in the image, including the front left door, the front left wheel, etc., as shown in the 2D graphic 325. The classifying AI has determined with a confidence level of 1.0 that the front left wing, the front left door, and the left mirror are shown in the image, as listed above the 2D graphic 325 in the list 335.

If the view of the car provided in the image is inadequate for capturing the car part, the classifying AI may have a lower degree of confidence in the vehicle part being viewed. FIG. 3c, for example, shows a display 340 of a view of the car from very close range. The dynamic display 340 may utilize a threshold confidence level for indicating in the 2D graphic 345 whether a certain vehicle part is being viewed. For example, a confidence level of 0.5 or above, as determined by the classifying AI, may be used as the threshold for indicating the part is being viewed (by e.g., coloring the part red in the 2D graphic 345). In the display 340 of FIG. 3c, the classifying AI has not met this threshold for any part of the car captured in the image. Thus, the 2D graphic 345 does not indicate any vehicle part is being seen in the image. However, as can be seen above the 2D graphic 345, the three parts with the highest confidence levels are still listed with their corresponding confidence levels in the list 355. The classifying AI has determined that the windshield (0.39 confidence level), left mirror (0.37 confidence level) and front left window (0.27 confidence level) are shown in the image.

The classifying AI as described above, alone in combination with further classifiers and/or simpler processing mechanisms, may calculate and optionally provide a variety of additional information to the user via the dynamic display. For example, the viewpoint of the camera relative to the axes of the car may be calculated. In FIGS. 3a-b, this viewpoint is indicated by the small white dot at the center 310, 330 of the 2D graphic 305, 325, provided at a location on the circumference of a circle representative of a circle surrounding the car (in the plane of the 2D graphic 305, 325). In FIG. 3c, because the image is inadequate, no white dot is shown on the circle in the center 350 of the 2D graphic 345 because the viewpoint of the camera relative to the axes of the car is not known with sufficient confidence.

In another example, a series of images (e.g., video) may be taken of the vehicle, and the application may track which parts of the vehicle have been captured, using, for example, a threshold confidence level in one or more images. The application may request a full 360 degree view of the vehicle, i.e., images corresponding to the entirety of the vehicle including images from high and low heights to capture roof and lower vehicle parts, respectively, and indicate to the user when sufficient image data has captured. The sufficiency of the captured image data can be determined based on the results of the classifiers discussed herein (e.g., a threshold confidence level is met for each requested part), or could be based on the number of images covering each identified part of the car. The classifiers utilized may be trained to evaluate multiple images, such as evaluating multi-frame portions of video files. Alternatively, the application may require a certain number of images be taken per a set number of degrees around the vehicle. For example, the application could require that an image be captured for every 15-30 degrees around the vehicle in the horizontal plane, as well as a certain number of shots to be taken from high or low heights for certain specific parts (such as bumper sills and the roof).

Previous systems may be hindered by the quality of the images captured by the user and a significant amount of time may be wasted if, for example, the initial information sent to the server is deemed inadequate by the classifying AI. The user who may no longer be in proximity to the car may be requested to provide further views, thereby starting the process all over. In contrast, the exemplary embodiments described herein allow the application to prompt the user, in real time, to capture one or more images from a particular angle relative to the car. For example, the application may determine that one or more vehicle parts is not adequately captured in the existing image data, and indicate to the user, in real time, which aspects of the vehicle require further documentation. In the exemplary systems described herein, the user may be guided in real-time to specific viewing angles of the vehicle so that the captured images are sufficient for providing the damage assessment.

The mobile application may also obtain data from the mobile device on which it is operating regarding the location of the mobile device, including potentially the height. Using a calculation of the height based on captured images or from other information obtained by the application, the application may guide the user to increase or decrease the height of the camera to capture additional information (such as images of the roof, undercarriage, or the lower portions of bumper covers and doors). The images can also be analyzed to determine the distance of the camera from the vehicle. Alternatively, this distance can be based on information obtained from a sensor such as, for example, a LIDAR sensor embedded in the mobile device. Information from other types of sensors may also be used to determine the distance, such as ultrasonic, infrared, or LED time-of-flight (ToF). The application could also determine whether the angle of the photograph should be changed to improve the ability of the application to provide a damage assessment. The angle can be adjusted in the vertical plane and/or the horizontal plane to provide e.g., an image perpendicular to the vehicle, an image level with the midpoint of the height of the car but not perpendicular to the side, or an image from an angle above the car.

In a preferred embodiment, the classifying AI as described herein is agnostic with respect to the make/model of the vehicle being assessed. In prior systems, a user may be required to manually enter initial information, such as the vehicle identification number (VIN) or make/model of the vehicle, so that the classifying AI for these previous systems may focus its calculations based on known properties of the vehicle. In the exemplary application described herein, a user may simply open the application and begin capturing images of the vehicle without entering any initial information with respect to the vehicle. In alternative embodiments, the class of vehicle, such as sedan, coupe, truck, van, minivan, station wagon, motorcycle, etc., or some other information, might be obtained from the user to determine which classifying AI to use. Alternatively, a classifier might be used that can determine the class of the vehicle, or determine the make, model, and/or year of the vehicle based on the image information.

The classifying AI described herein may be combined with further classifiers such as, for example, a damage classifier for assessing visual damage to the exterior of the vehicle or inferring internal damage that may not be immediately visible. These classifiers could determine whether a part should be repaired or replaced, and, if repaired, an estimate of the labor hours for the repair. Alternatively, the classifier could identify the damage as belonging to various preset severity levels. With this combination of classifiers, the application may immediately produce a full or partial initial estimate for the repair of the damage to the vehicle. Alternative assessments may be made, including, for example, a recommendation of whether to file an insurance claim based on an estimated cost value exceeding a threshold cost value or not, or an analysis of the impact of a claim on future insurance premiums compared to the cost of the repair. An additional assessment may be used to recommend whether the car may be driven in its current state, or whether the damage suffered by the car is sufficiently severe to preclude driving the vehicle prior to repair. When the damage is sufficiently severe, the application may recommend that a towing service be contacted.

In some embodiments, a full or partial estimate is displayed via the application. These full or partial estimates may be based only on the output of the classifiers in the application itself, or the estimates may be based on information received from remote classifiers that have also analyzed at least some portion of the images obtained by the application. In some embodiments, the identification of parts imaged, the assessments of damage and repair operations, and a full or partial estimate of the damage can be assessed without information regarding the make, model or year of the vehicle being analyzed.

In an additional embodiment, where the classifiers determine that there is the possibility of internal or mechanical damage, the user may be prompted to open portions of the vehicle such as the hood, trunk, or doors, to evaluate additional damage.

The damage assessments may also include assessments of minor or cosmetic damage. These assessments could be used in non-repair situations, for example, to help in the valuation of a vehicle. The minor damage assessments could be used, optionally along with other information regarding the vehicle, to determine the overall condition of the vehicle. This could be used to determine the value of the car in the resale market, e.g., as a trade in or in a private sale. Alternatively, these assessments may also determine a salvage value of the car by, for example, evaluating the individual values of the vehicle parts for sale as repair parts. These classifiers could determine not only what parts have no damage, but also where there is damage, the expected expense or labor to place the part in a salable form.

In a further embodiment, the included dynamic classifiers used in the application make damage assessments (such as whether a part is damaged or not, whether a part should be repaired or replaced, labor hours, or damage severity level), and, for these assessments, generate confidence levels associated with these assessments. The system could identify parts for which the assessment has a confidence level below a certain level and prompt the user to take additional images of that portion of the vehicle. The dynamic display could indicate what parts of the vehicle currently seen by the camera have an adequate level of confidence. The dynamic display could further indicate which parts of the car have damage assessments with a predetermined level of confidence in images captured earlier in that session. This will enable the user to isolate which additional images need to be captured for an adequate collection of photos.

This indication could indicate the need to move the camera closer or further from the areas of potential damage based on damage assessments and levels of confidence, including optionally a dynamic display of the location of the vehicle. The indication of which parts need additional images can also be provided by displaying already acquired images, or portions thereof. The information related to the need to move the camera closer or further can be based on information obtained from the mobile device using a LIDAR sensor or any of the other sensors discussed above. The application could give a general indication that the camera should be moved closer, or further, or it could give a recommended distance from the area of interest of the vehicle. The application may also give recommendations, or request additional images be taken, from various angles, as discussed above, based on the damage assessments and levels of confidence.

To the extent that additional information regarding the vehicle is desired, this information could be obtained by the application prompting for photographs to be taken of other specific portions of the vehicle such as a VIN plate, a license plate, the odometer, other vehicle information provided elsewhere, such as information regarding the vehicle located on the driver's front side door jamb which might include information regarding trim levels, paint colors, manufacturer, model, the VIN, tire information. Sometimes instead of the front door jamb this information is located on the door, the A-pillar, or the glove box. Additionally, the application might request images of a driver's license or insurance card.

The classifying AI described herein is sufficiently compact to run on a mobile device, and may include multi-task learning so that one model may perform multiple tasks. In previous systems, for example, a dedicated classifier may be used for each part of the car (i.e., determine whether the windshield is shown in the image, whether the hood is shown in the image, etc.). However, it may not be feasible to run this AI architecture on a user device, due to space constraints and the processing burden involved. Thus, the model described herein is trained on a different network architecture than previous systems so that it fits on a user device with far more limited capabilities than e.g., a server. Thus, the AI may be less robust than a classifier architecture running on a server, however, the AI may be sufficiently robust to accurately classify features from a high quality image, as described above.

Any of the embodiments of this system could be used in combination with separate AI classifying systems running on a more powerful architecture that could be used for further analysis of the images of the damaged vehicle captured by the system.

In various embodiments of the disclosure, the user may manually decide when to take pictures of the car while the application is running and the car is being viewed. Alternatively, the system may decide to take pictures based on confidence levels of unimaged parts. Additionally, the user may manually, or the system may automatically, record videos of portions of any session. In these scenarios, the confidence levels could be based on part identification, or damage assessments, or a combination of confidence levels for both. Additionally, the images taken individually, or the frame rate of the video, may be varied based on the information already obtained from the already captured images or video. Any of the embodiments above can equally be performed using video or still image captures.

Classifiers in general may be designed to progressively learn as more data is received and processed. Thus, the exemplary application described herein may periodically send its results to a centralized server so as to refine the model for future assessments.

Figure 4:
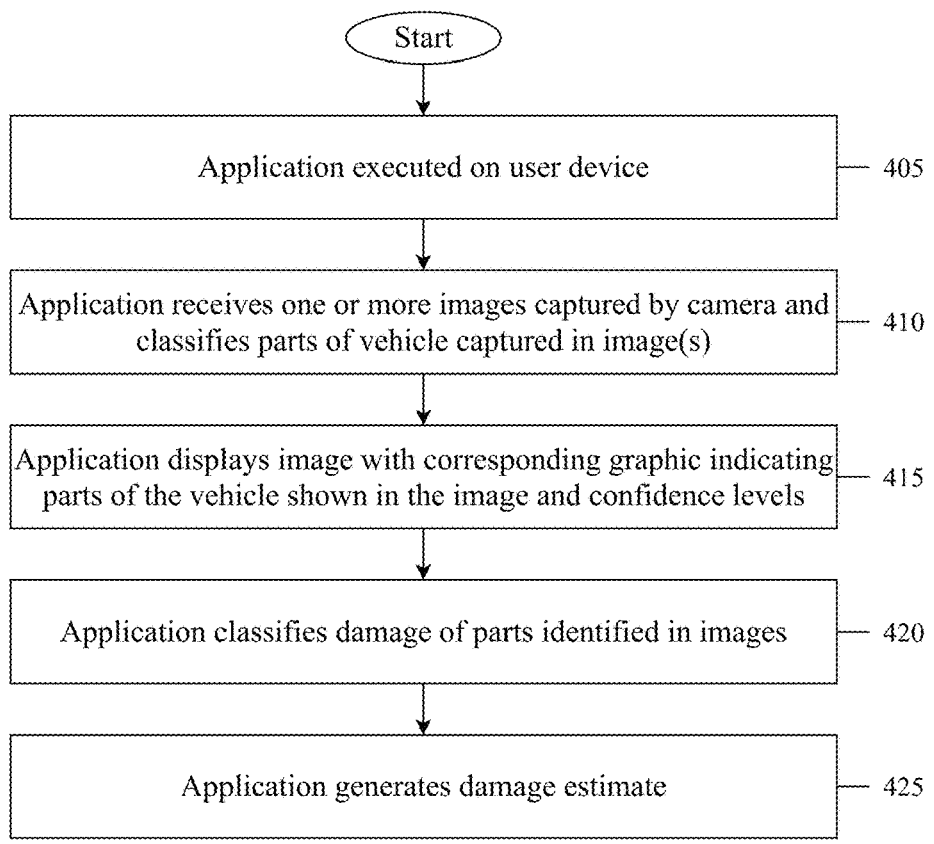
FIG. 4 shows an exemplary method for providing a real-time damage estimate using an artificial intelligence (AI) based application according to various exemplary embodiments described herein.

FIG. 4 shows an exemplary method 400 for providing a real-time damage estimate using an artificial intelligence (AI) based application according to various exemplary embodiments described herein.

In 405, a user executes the application on a user device, e.g., a smartphone. The application may direct the user to begin capturing images of a vehicle using a camera of the user device.

In 410, the application receives one or more images captured by the camera and classifies one or more parts of the vehicle captured in the image(s) using one or more classifiers.

In 415, the application displays an image with a corresponding graphic indicating the parts of the vehicle shown in the image, with corresponding confidence levels, as described above. The user may be directed to capture additional images to provide a complete image set suitable for a damage analysis.

In 420, the application executes an additional one or more classifiers to determine the damage suffered by the parts identified in the images.

In 425, the application generates a damage assessment, e.g., an estimate for repairing the damage of the vehicle.

Those skilled in the art will understand that the above-described exemplary embodiments may be implemented in any suitable software or hardware configuration or combination thereof. An exemplary hardware platform for implementing the exemplary embodiments may include, for example, any mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made to the present disclosure, without departing from the spirit or the scope of the exemplary embodiments. Thus, it is intended that the present disclosure cover modifications and variations of the exemplary embodiments provided they come within the scope of the appended claims and their equivalent.

The invention claimed is:

1. A user device, comprising:
   a camera configured to capture a series of images of a vehicle;
   a processor configured to perform operations comprising:
   receiving a first image of the vehicle from a first viewpoint;
   classifying, using an artificial intelligence (AI) model, one or more parts of the vehicle captured in the first image; and
   generating, for the first image, a first graphic indicating the parts of the vehicle being displayed in the first image; and
   a display configured to receive the first image and the first graphic from the processor and display the first image of the vehicle overlaid with the first graphic indicating the parts of the vehicle being displayed in the first image, wherein the first graphic comprises a two-dimensional representation of the vehicle showing at least one part of the vehicle that is not visible on a three-dimensional representation of the vehicle from a same point of view.

2. The user device of claim 1, wherein the operations further comprise:
   executing a web based application, wherein the classifying is based on information provided by the web based application.

3. The user device of claim 2, wherein the information is a classifying artificial intelligence (AI) model that is executed on the user device.

4. The user device of claim 1, wherein the first graphic comprises a confidence level associated with each part that is identified in the first image.

5. The user device of claim 1, wherein the first graphic indicating the parts of the vehicle being displayed in the first image comprises text identifying each of the parts.

6. The user device of claim 1, wherein each of the parts or a portion of the vehicle being displayed in the image are highlighted in the two-dimensional representation of the vehicle.

7. The user device of claim 1, wherein the operations further comprise:
   receiving a second image of the vehicle from a second viewpoint;
   classifying, for the second image, one or more parts of the vehicle captured in the first image;
   generating, for the second image, a second graphic indicating the parts of the vehicle being displayed in the second image,
   wherein the display is further configured to receive the second image and the second graphic from the processor and display the second image of the vehicle with the second graphic indicating the parts of the vehicle being displayed in the second image.

8. The user device of claim 7, wherein the display dynamically adjusts the display of the first image including the first graphic and the second image including the second graphic.

9. The user device of claim 1, wherein the series of images comprise video images, and wherein the display displays an image with a corresponding graphic for each of the series of video images.

10. The user device of claim 1, wherein the operations further comprise:
    determining an angle of the camera relative to the vehicle, wherein the angle is displayed in the first graphic.

11. The user device of claim 1, wherein the operations further comprise:
    determining the series of images that are required to perform a complete evaluation of the vehicle; and
    outputting instructions to be displayed on the display to instruct a user of the user device to collect the series of images.

12. A user device, comprising:
    a camera configured to capture a series of images of a vehicle; and
    a processor configured to perform operations comprising:
    receiving a series of images of the vehicle from one or more viewpoints;

classifying, for each of the images, one or more parts of the vehicle captured in the image using a web-based application comprising a first artificial intelligence (AI) model for identifying the parts of the vehicle, wherein the first AI model generates confidence levels for identifying parts of the vehicle;

classifying, for each of the images, an extent of damage of the classified one or more parts of the vehicle captured in the images using the web-based application comprising a second AI model for identifying the damage of the vehicle; and generating an estimate to repair the damage of the one or more parts of the vehicle.

13. The user device of claim 12, wherein the first AI model is a multi-task model for identifying multiple parts of the vehicle in the image.

14. The user device of claim 12, wherein the first and second AI models comprise a non-linear hierarchical algorithm, a neural network, a convolutional neural network, a recurrent neural network, a long short-term memory network, a multi-dimensional convolutional network, a memory network, a fully convolutional network, or a gated recurrent network.

15. The user device of claim 12, wherein the first and second AI models generate respective confidence levels for the respective classifications.

16. The user device of claim 12, wherein the first and second AI models comprise the same AI model.

17. The user device of claim 12, wherein the web-based application receives information from the user device to guide the capture of images, the information comprising height information, distance information or vehicle information.

18. The user device of claim 12, wherein the first and second AI models are agnostic with respect to identifying features of the vehicle including a make and model of the vehicle.

19. The user device of claim 12, wherein the processor is configured to perform further operations comprising:

submitting a portion of the series of images to a remote server for further classification; and receiving information from the remote server to inform the estimate to repair the damage of the vehicle.

20. The user device of claim 12, wherein the processor is configured to perform further operations comprising:

generating a confidence level for the damage estimate; and prompting a user of the user device to capture additional images when the confidence level for the damage estimate is below a predetermined threshold.

* * * * *